Patented June 7, 1938

2,119,701

UNITED STATES PATENT OFFICE 2,119,701

ALKOXYALKYL MERCURY NITROGEN COMPOUNDS

Jürgen Callsen, Wuppertal-Elberfeld, Germany, assignor to Winthrop Chemical Company, Inc., New York, N. Y., a corporation of New York No Drawing. Application April 22, 1936, Serial No. 75,871. In Germany June 29, 1934

12 Claims. (Cl. 260—13)

This invention relates to organic mercury compounds in which one valency of the mercury atom is bound to an alkoxyalkyl radical and the other to a nitrogen atom.

In accordance with the present invention new, valuable, organic mercury compounds, in which the one valency of the mercury atom is bound to an alkoxyalkyl radical and the other valency is linked to a nitrogen atom are obtainable by reacting a mercury compound in which one valency of a mercury atom is attached to an alkoxyalkyl radical and the other to a hydroxyl group or to an organic or inorganic acid radical, with a nitrogen compound containing attached to the nitrogen hydrogen atoms at least one of which is replaceable or is replaced by a metal, in the presence of a suitable solvent.

As such organic or inorganic acid radicals there come, for instance, into consideration the chlorine, bromine or iodine atom, or the nitrate, sulfate, acetate, lactate, tartrate, citrate or succinate radical.

As starting alkoxyalkyl mercury compounds there may, for instance, be mentioned methoxyethyl mercury acetate, methoxypropyl mercury nitrate, hydroxyethyloxyethyl mercury sulfate, chloroethyloxyethyl mercury chloride, benzyloxyethyl mercury nitrate, methoxycyclohexyl mercury acetate and 2-methoxypropane-3-carboxylic acid 1-mercury nitrate.

As nitrogen compounds containing attached to the nitrogen atom hydrogen atoms at least one of which is replaceable by a metal, for instance, the amides or imides of carboxylic acids and sulfonic acids may be used. The amido or imido group may be bound to an alkyl group as, for instance, in undecylamine, dodecylamine, or ocetodecylamine, or in the hydroxy, halogen, nitro, amino, sulfonic acid and carboxylic acid substituted undecylamines, dodecylamines or octodecylamines. The amido or imido group may also be linked to a cycloalkyl or to an aryl radical as, for instance, in the case of cyclohexylamine, chlorocyclohexylamine, cyclopentylethylamine, hydroxycyclohexylamine, nitrocyclohexylamine, aniline, monomethyl aniline, toluylamine, toluylmethylamine, acetoxyaniline, nitroaniline, p-aminophenol, chlorophenylamine, diphenylamine, bromophenylmethylamine, sulfanilic acid, naphthylamine, aminonaphthylsulfonic acid, aminopyrenesulfonic acid, anthranilic acid and the like. Also ammonia may be used, preferably in the form of alkali compounds as, for instance, in the case of sodium and potassium amide, in which form ammonia is very well suited for the process according to the present invention. As amides of carboxylic acids, for instance, acetamide, propionic acid amide, butyric acid amide, chloroacetamide, stearic acid amide, oleic acid amide, benzoic acid amide, naphthoic acid amide and salicylic acid amide may be employed. Suitable amides of sulfonic acids are, for instance, propane sulfonic acid amide, benzene sulfonic acid amide, chlorobenzene sulfonic acid amide, phenol sulfonic acid amide, aminobenzene sulfonic acid amide, p-toluene sulfamide, p-toluene sulfochloroamide and p-toluene sulfobromoamide. The imido group may also be cyclically bound as in the case of barbituric acids, for instance 5,5-diethylbarbituric acid, and 5,5-phenylethylbarbituric acid, phthalimide, the imide of benzene-1-sulfonic-2-carboxylic acid, carbazole, benzotriazole, benzimidazole and its alkyl derivatives, for instance, methyl or ethyl benzimidazole, naphsultam acid and its nitro- derivatives, pyrrol, indole, succinic acid imide, morpholine, thiomorpholine, sulfomorpholine, purine derivatives such as 6-hydroxypurine, 2,6-dihydroxypurine, 6-aminopurine, 2-amino-6-hydroxypurine, 2,6,8-trihydroxypurine, 1,3-dimethylxanthine and 2,6-dihydroxy-8-chloropurine, azenaphthene imine alloxan, parabanic acid, allantoin, violuric acid, uracil, hydantoin, $\alpha$-dimethylhydantoin, $\beta$-ethylhydantoin, $\alpha$-methylhydantoin, pseudothiohydantoin and thiohydantoin. Also hydrazoic acid may be mentioned in this connection. It is preferably employed in the form of its salts, for instance, its potassium, sodium, calcium, magnesium or lithium salt.

As suitable solvent especially water, but also organic solvents miscible or immiscible with water, for instance, methyl alcohol, ethyl alcohol, propyl alcohol, ethylether, acetone, acetic acid ester, methylethylketone and the like may be employed.

When carrying out the process according to the present invention by starting with the mercury compounds in the form of their salts, the reaction is preferably performed with the metal-, for instance, the alkali metal compounds of the nitrogenous reactants, or with the addition of acid-binding agents, such as alkali or amines, for instance caustic soda solution, sodium carbonate, sodium bicarbonate, ammonia, ammonium carbonate, dimethylamine or trimethylamine. The reaction may also be carried out by effecting the connection of the mercury with a carbon atom, on the one hand, and with the nitrogen atom, on the other hand, by reacting for instance, a mercury salt, such as mercuric acetate, mercuric lactate, tartrate, citrate, succinate, or also mercuric hydroxide simultaneously upon an unsaturated aliphatic compound which may be in the gaseous or in the liquid state, and a nitrogen compound of the kind specified in the presence of an aliphatic alcohol. Instead of the above mentioned mercuric salts also mercuric oxide may be used in the presence of an acid, for instance acetic acid, citric acid, lactic acid or tartric acid. As unsaturated aliphatic compound, for instance ethylene, propylene or tetrahydronaphthalene may be employed. If a solid unsaturated aliphatic compound is used, preferably a solvent for this compound is added.

The new compounds are generally water-insoluble products. By decomposing them, for example, with hydrochloric acid, nitric acid, or aquaregia and after neutralizing the acid, for instance, with ammonia, ammonium carbonate or sodium bicarbonate, a precipitate of mercuric sulfide is obtained on the addition of ammonium sulfide. The new compounds may be used for technical and pharmaceutical purposes. On account of their bactericidal and fungicidal properties they may be used as preservatives, for instance for the preservation of wood, as coatings for ship bottoms, for combating parasites, especially for immunizing seed grain, and for disinfecting purposes, for instance, for the disinfection of instruments.

As seed grain immunizers the alkoxyalkyl mercury nitrogen compounds are distinguished over the known mercury nitrogen compounds, particularly the aromatic mercury nitrogen compounds, by the fact that they do not cause any noticeable irritation of the human skin. On the other hand, they are very efficacious and as to their efficacy for immunizing seed grain, they surpass the known alkyl mercury nitrogen compounds. Particularly the alkoxyalkyl mercury nitrogen compounds the nitrogen atom of which is a member of a heterocyclic system have proved to be suitable. As such compounds there may be mentioned by way of example methoxyethyl mercury carbazole, methoxyethylmercury benzotriazole, ethoxyethyl mercury azenaphthene imine, benzyloxyethyl mercury barbituric acids, hydroxyethyloxyethyl mercury 2-methylbenzimidazole, ethoxyethyl mercury naphsultam acid and methoxypropyl mercury hydantoin.

The alkoxyalkyl mercury nitrogen compounds come particularly into consideration as dry seed grain disinfectants. For this purpose they may be mixed with the usual inert diluents such as for instance talc, gypsum, wood flour, clay or slate flour. Sodium carbonate, sodium bicarbonate and potassium carbonate may likewise be used as carriers. Also other fungicidal substances may be mixed with the alkoxyalkyl mercury compounds, such as for instance arsenic oxide, methyl arsine sulfide, methyl arsine oxide, phenyl mercury acetate and methoxyethyl mercury chloride. The seed grain disinfectants thus obtained are preferably employed in a mercury concentration of about 1 to about 3%.

For the purpose of immunizing seed grain it is not necessary to start with the finished alkoxyalkyl mercury nitrogen compounds, but also a mixture of the water-soluble nitrogen compounds and the mercury compounds may be employed, since the alkoxyalkyl mercury compound is formed from the mixture by the action of the humidity of the soil.

The invention is further illustrated by the following example without being restricted thereto, the parts being by weight:

Example 1

29.5 parts of methoxyethyl mercury chloride are dissolved in 500 parts of hot water. A solution of 18.5 parts of potassium phthalimide in 100 parts of water is added to the solution. The crystalline magma which separates is filtered with suction and dried. The N-methoxyethyl mercury phthalimide forms almost colorless crystals which are difficultly soluble in cold water, readily soluble in hot water, alcohol and acetone. They melt at 89 to 90° C.

Instead of methoxyethyl mercury chloride also ethoxyethyl mercury chloride, propyloxyethyl mercury chloride, cyclohexyl oxyethyl mercury chloride, as well as methoxypropyl mercury chloride, ethoxypropyl mercury chloride, methoxybutyl mercury chloride, methoxy-(phenyl)-ethyl mercury chloride, and the corresponding acetates, sulfates, nitrates, lactates, citrates, tartrates, bromides and iodides may, for instance, be used. The mercury compounds may also react in the form of their hydroxides.

Instead of potassium phthalimide also, for example, sodium phthalimide, or phthalimide as such may be employed. Also the imide of benzene-1-sulfonic-2-carboxylic acid and its salts, for instance, its sodium or potassium salts are suitable to react with each of the above specified compounds.

Example 2

29.5 parts of methoxyethyl mercury chloride are dissolved in 1000 parts of water and treated with 23 parts of p-toluene sulfochloro amide sodium in a five-fold quantity of water. Reaction immediately takes place. From the reaction mixture which is rendered turbid soon an abundant crystal mass separates.

The N-methoxyethyl-mercury-para-toluene sulfochloroamide forms a white crystalline powder which is soluble in alcohol and water. On heating the substance starts to sinter at about 70° C. No decided melting point can be established since already at a temperature above 100° C. decomposition occurs.

Instead of methoxylethyl mercury chloride also ethoxyethyl mercury chloride, propyl oxyethyl mercury chloride, benzyl oxy ethyl mercury chloride cyclohexyloxyethyl mercury chloride, as well as methoxypropyl mercury chloride, ethoxypropyl mercury chloride, methoxy butyl mercury chloride, methoxy-(phenyl)-ethyl mercury chloride, and the corresponding acetates, sulfates, nitrates, lactates, citrates, tartrates, bromides and iodides may, for instance, be used. The mercury compounds may also react in the form of their hydroxides.

Instead of para-toluene sulfochloro amide also benzene sulfochloroamide sodium, 1-ethyl benzene-4-sulfochloroamide sodium, para-thymosulfochloroamide sodium, as well as their halogen substitution products, for instance, 1-methyl-2-bromobenzene-4-sulfochloro amide sodium or nitro-substituted products, for example, 1-ethyl-3-nitrobenzene-4-sulfochloroamide sodium may be used. Instead of the sodium salts also the corresponding potassium salts of the said compounds may be employed.

Example 3

29.5 parts of methoxyethyl mercury chloride dissolved in 1000 parts of water are mixed with an aqueous solution of 20.6 parts of the sodium salt of the 5,5-diethylbarbituric acid. First a milky turbidity can be observed, then an oil separates which finally solidifies to crystals. The crystals are filtered with suction and purified by redissolving in hot water. The N-methoxyethyl mercury 5,5-diethylbarbituric acid forms colorless crystals which are soluble in water and alcohol, melting at 121–122° C.

When replacing in the above example the 29.5 parts of methoxyethyl mercury chloride by 33.9 parts of methoxyethyl mercury bromide and proceeding in the same manner as above indicated the same product melting at 121–122° C. is obtained.

The preparation thus obtained does not considerably attack the animal skin contrary to many known mercury derivatives, particularly to aromatic mercury compounds.

Instead of methoxyethyl mercury chloride also ethoxyethyl mercury chloride, propyloxeyethyl mercury chloride, benzyloxyethyl mercury chloride, cyclohexyloxyethyl mercury chloride, as well as methoxypropyl mercury chloride, ethoxybutyl mercury chloride, methoxy-(phenyl)-ethyl chloride, methoxy-(cyano)-cyclohexyl mercury chloride, methoxylcyclohexyl sulfonic acid mercury chloride, methoxycyclopentyl mercury chloride, and the corresponding acetates, sulfates, nitrates, lactates, citrates, tartrates, and iodides, may, for instance, be used. The mercury compounds may also react in the form of their hydroxides.

Similar products are obtained when, for example, the sodium, potassium, ammonium, lithium or magnesium salts of 5,5-dimethyl barbituric acid, 5,5-dipropylbarbituric acid, 5,5-dicyclohexylbarbituric acid, 5,5-ditolyl barbituric acid, 5,5-diethyl barbituric acid, 5,5-diphenyl barbituric acid are used instead of the sodium salt or of the potassium, lithium, or magnesium salt of 5,5-diethylbarbituric acid.

Example 4

A solution of 29.5 parts of methoxyethyl mercury chloride in 500 parts of hot water are mixed with 1000 parts of talc and a solution of 20.6 parts of the sodium salt of 5,5-diethyl barbituric acid in 100 parts of water is carefully added. The reaction product is dried while stirring. A powder which after dilution is suitable for immunizing seed grain is thus obtained.

Instead of methoxyethyl mercury chloride also ethoxyethyl mercury chloride, propyloxyethyl mercury chloride, benzyloxy ethyl mercury chloride, cyclohexyloxyethyl mercury chloride, as well as methoxypropyl mercury chloride, ethoxypropyl mercury chloride, methoxybutyl mercury chloride, methoxy-(phenyl)-ethyl chloride and the corresponding acetates, sulfates, nitrates, lactates, citrates, tartrates, bromides and iodides may, for instance be used. The mercury compounds may also react in the form of their hydroxides.

Instead of 5,5-diethyl barbituric acid sodium or also for example, its potassium, ammonium, lithium or magnesium salts, the sodium, potassium, ammonium, lithium, or magnesium salts of 5,5-dimethyl barbituric acid, 5,5-dipropyl barbituric acid, 5,5-dicyclohexyl barbituric acid, and 5,5-diphenyl barbituric acid may be used.

Likewise the sodium salts of 5-phenyl-5-ethyl barbituric acid, 5-tolyl-5-ethyl barbituric acid, 5-hydroxyphenyl-5-ethyl barbituric acid, 5-ethyl-5-methyl barbituric acid, 5-hexyl-5-ethyl barbituric acid, 5-cyclohexyl-5-ethyl barbituric acid or 5-phenyl-5-butyl barbituric acid, as well as para-toluene sulfochloroamide sodium, 1-ethylbenzene-4-sulfochloroamide sodium, para-thymol-sulfochloroamide sodium, as well as their halogen substitution products, for instance, 1-methyl-2-bromobenzene-4-sulfochloroamide sodium or nitro-substituted products, for instance, 1-ethyl-3-nitrobenzene-4-sulfochloroamide sodium may be used. Instead of the sodium salts also the corresponding potassium salts of the said compounds may be employed.

Example 5

36.8 parts of 5,5-diethyl barbituric acid are mixed with 55.2 parts of methoxyethyl mercury hydroxide. Thereby the temperature is raised. If necessary, the mixture is heated for a short time on the water bath until the reaction is complete. After the mixture has been removed from the water bath the mass soon solidifies to crystals. Purification is performed by recrystallization from alcohol or water. Thus crystals melting at 121–122° C. are obtained, which are identical with the product described in Example 3.

Instead of 5,5-diethyl barbituric acid, 5,5-dimethyl barbituric acid, 5,5-dipropyl barbituric acid, 5,5-dicyclohexyl barbituric acid, 5,5-diethyl hexonyl barbituric acid, 5-ethyl-5-methyl barbituric acid, 5-hexyl-5-ethyl barbituric acid, 5-cyclohexyl-5-ethyl barbituric acid, or 5-phenyl-5-butyl barbituric acid may be employed.

The methoxyethyl mercury hydroxide may be replaced by ethoxyethyl mercury hydroxide, propyloxyethyl mercury hydroxide benzyloxyethyl mercury hydroxide, cyclohexyloxyethyl mercury hydroxide, methoxypropyl mercury hydroxide and ethoxypropyl mercury hydroxide.

Example 6

27.6 parts by weight of methoxyethyl mercury hydroxide are mixed with 18.3 parts of orthobenzoic acid sulfimide whereupon reaction immediately takes place and a rise in temperature occurs. If necessary, the reaction may be completed by slightly heating the mixture. The reaction product solidifies to a hard mass, which is recrystallized from methyl alcohol. The N-methoxyethyl-mercury-ortho-benzoic acid sulfimide forms colorless crystals which dissolve in water and ether to a slight extent and which are readily soluble in methyl and ethyl alcohol and acetone. They melt at 123–124° C.

Example 7

27.6 parts of methoxyethyl mercuric hydroxide are mixed with 17.1 parts of para-toluene sulfamide. The reaction immediately takes place and is completed by short heating in the steam bath. The methoxyethyl mercury para-toluene sulfamide forms a colorless sirupy mass which is readily soluble in alcohols and which is difficultly soluble in ether and water. Upon adding dilute hydrochloric acid, para-toluene sulfamide separates while evolving gas, whereas in the hydrochloric acid filtrate on the addition of ammonia and ammonium sulfide the presence of mercury may be detected by a precipitation of mercury sulfide.

Instead of methoxyethyl mercuric hydroxide also ethoxyethyl mercuric hydroxide, propyloxyethyl mercuric hydroxide, benzyloxyethyl mercuric hydroxide, cyclohexyloxymercuric hydroxide, methoxypropyl mercuric hydroxide and ethoxypropyl mercuric hydroxide may, for instance, be used.

Example 8

11 parts of methoxyethyl mercuric hydroxide are dissolved in 35 parts of ether and mixed with an ethereal solution of 0.85 part of cyanamide. Reaction immediately takes place; methoxyethyl mercuric cyanamide separates as an almost colorless sirupy mass. It is soluble in water and alcohol and almost soluble in ether. Upon adding hydrochloric acid, decomposition takes place; with the evolution of gas, a hydrochloric acid solution is formed which separates black mercury sulfide on the addition of ammonia and ammonium sulfide.

Instead of cyanamide sodium amide or potassium amide may be used. Also diphenylamine, dodecylamine and undecylamine have proved to be suitable.

Instead of methoxyethyl mercuric hydroxide also ethoxy ethyl mercuric hydroxide, chloroethoxyethyl mercuric hydroxide, propyl oxyethyl mercuric hydroxide, benzyloxyethyl mercuric hydroxide, cyclohexyloxyethyl mercuric hydroxide, methoxypropyl mercuric hydroxide, ethoxypropyl mercuric hydroxide, as well as hydroxyethyloxyethyl mercuric hydroxide, hydroxypropyloxyethyl mercuric hydroxide may, for instance, be used.

Example 9

8.3 parts of methoxy ethyl mercuric hydroxide are mixed with 2.5 parts of dicyandiamide. Thereby a rise in temperature occurs. For completing the reaction, the mixture is heated for further thirty minutes on the water bath. The reaction mass is repeatedly extracted with ether. The extract after the solvent has been distilled off contains practically no residue which proves that all the methoxyethyl mercuric hydroxide has been bound by the dicyandiamide. The methoxyethyl mercury dicyandiamide forms an almost colorless sirupy mass which is readily soluble in water and alcohol and which is almost insoluble in ether.

Instead of methoxyethyl mercury hydroxide the hydroxides mentioned in the foregoing example may for instance be used.

Example 10

2.8 parts of methoxyethyl mercury hydroxide are dissolved in 20 parts of ether and treated with an ethereal solution of 0.43 part by weight of hydrazoic acid (azoimide). After some time an abundant crystal mass separates, which is separated off from the ether. Methoxyethyl mercury azide forms colorless crystal leaflets which are readily soluble in water and alcohol and which are only very difficultly soluble in ether. They melt at 65–66° C.; at a higher temperature the substance puffs off. On pouring over hydrochloric acid, solution takes place with the evolution of ethylene; from the solution the mercury sulfide separates on the addition of ammonia and ammonium sulfide.

The above mentioned azide can likewise be obtained from the salts of the methoxyethyl mercury hydroxide and metal azides in aqueous solution when working with great concentrations. Thus, for instance, a solution of 3.18 parts of methoxyethyl mercury acetate in the same quantity of water on the addition of a concentrated aqueous solution of 0.65 part of sodium azide yields an abundant separation of crystallized methoxyethyl mercury azide.

The sodium azide used in the above described reaction may be replaced, for instance, by potassium, lithium, calcium and magnesium azide.

Instead of methoxyethyl mercuric hydroxide also ethoxyethyl mercuric hydroxide, propyloxyethyl mercuric hydroxide, benzyloxyethyl mercuric hydroxide, cyclohexyloxyethyl mercuric hydroxide, methoxypropyl mercuric hydroxide, ethoxypropyl mercuric hydroxide, methoxy-(cyano)-cyclohexyl mercuric hydroxide, as well as hydroxyethyloxyethyl mercuric hydroxide, hydroxypropyloxyethyl mercuric hydroxide may, for instance, be used.

Example 11

20 parts of powdered sodamide are gradually introduced into a solution of 147 parts of methoxyethyl mercury chloride in 700 parts of benzene. Reaction immediately takes place with the evolution of heat. After the reaction is complete, the benzene solution is separated from sodium chloride and liberated under reduced pressure from the solvent. A sirupy residue which soon solidifies to crystals is obtained which is recrystallized by dissolution in alcohol and the addition of ether. The substance forms colorless crystals which are readily soluble in water and in alcohol and which are almost insoluble in ether. On heating, melting at about 90–92° C. takes place after previous sintering. On the addition of hydrochloric acid a solution is obtained with the evolution of ethylene, which solution separates yellow mercuric oxide on the addition of caustic soda lye.

Instead of methoxyethyl mercury chloride the chlorides mentioned in the second paragraph of Example 4 may be employed.

Example 12

55.5 parts of methoxyethyl mercury hydroxide are stirred with 33.5 parts of carbazole and after short standing the mixture is heated on the water bath until the reaction is complete. The product which solidifies on cooling is recrystallized from methyl alcohol.

Methoxy mercury carbazole forms yellowish crystals which are readily soluble in acetone, pretty readily soluble in alcohol and almost insoluble in water. They melt at 131–133 ° C.

Instead of methoxyethyl mercury hydroxide the hydroxides of the mercury compounds disclosed in the fourth part of Example 10 may be used.

Also substituted carbazoles, for instance, 3-methoxycarbazole, 3-methyl carbazole, 3-chlorocarbazole, 3-nitrocarbazole, 1-methyl carbazole, 1-nitro carbazole, 2-chlorocarbazole, 3,6-diiodocarbazole and 1,3,8-trichlorocarbazole may serve as nitrogenous reactants.

Example 13

16 parts of mercury acetate are dissolved in 100 parts of methyl alcohol and after ethylene has been introduced a solution of 10.4 parts of the sodium salt of 5,5-diethyl barbituric acid in 50 parts of normal caustic soda solution is added. The solution is a little concentrated under reduced pressure. Thus on cooling an abundant crystal separation takes place. It is recrystallized from water. Methoxyethyl mercury-5,5-diethyl barbituric acid possessing the properties described in Example 3 is thus obtained.

Instead of mercury acetate also mercuric hydroxide, mercuric lactate, mercuric tartrate and mercuric succinate may, for instance, be used. Instead of ethylene other unsaturated liquid or gaseous hydrocarbons, for instance propylene, cyclohexene or tetrahydronaphthalene may be used.

The 5,5-diethyl barbituric acid may be replaced by the compounds mentioned in the second paragraph of Example 5. Likewise potassium or sodium phthalimide as well as, for example the potassium or sodium salts of the imide of the benzene-1-sulfonic-2-carboxylic acid are suitable for the above described reaction.

Example 14

9.4 parts of aniline are converted into the sodium compound by means of 4 parts of sodamide (compare Journ. Chem. Soc. 71 page 464), 85 parts of benzene are poured over and the mixture is stirred with a solution of 29.4 parts of methoxyethyl mercury chloride in 130 parts of benzene for three hours at room temperature. The solution is then filtered off from the common salt which has separated and the benzene is evaporated in vacuo. The reaction product forms a brownish oil which solidifies on cooling. The compound decomposes with the evolution of ethylene on pouring over hydrochloric acid. In the solution thus obtained, aniline and mercury ion are detectable with the customary reagents.

Instead of the sodium compound of aniline also sodium acetyl aniline or sodium methyl aniline may, for instance, be employed.

Instead of the methoxyethylmercury chloride also the chlorides mentioned in the second paragraph of Example 4 may be used.

Example 15

To a solution of 69 parts of ethoxyethyl mercury acetate in 500 parts of alcohol a solution of 10 parts of sodium hydroxide in 20 parts of water is added. The solution of ethoxyethyl mercury hydroxide thus obtained is filtered clear. With this solution is incorporated a solution of 25 parts of benzotriazole in 500 parts of alcohol at room temperature while stirring. Stirring is continued for some time. It is not necessary to weakly boil the alcohol, however the reaction is accelerated thereby. After filtration the main quantity of the solvent is evaporated until the residue begins to crystallize. After three times recrystallizing the residue from dilute alcohol, the N-(ethoxyethylmercury)-benzotriazole is obtained in the form of brilliant snow-white crystals fusing at 117.5° C. The new compound is difficultly soluble in water, rather difficultly soluble in benzene and very easily soluble in methyl and ethyl alcohol. On pouring over ammonia water and ammonium sulfide solution, black mercury sulfide is formed only after a long time. Caustic soda solution, too, does not yield a separation of mercuric oxide. When heating the compound with a small amount of hydrochloric acid, it dissolves while evolving ethylene. Ammonia water and ammonium sulfide solution separate black mercuric sulfide, caustic soda solution precipitates red yellow mercuric oxide.

Instead of the benzotriazole used in this example also the 5-nitrobenzotriazole may be used. Further pyrrol, indol, succinic acid imide, morpholine, thiomorpholine, sulfomorpholine, azenaphthenimine, alloxane, parabanic acid, allantoin, uracil, hydantoin, α-dimethyl-hydantoin, pseudo-thiohydantoin, thiohydantoin, 6-hydroxypurine, 2-amino-6-hydroxy-purine, 2,6,8-trihydroxy-purine, 2,6-dihydroxy-purine, 1,3-dimethylxanthine, 2,6-dihydroxy-8-chloropurine and 3,7-dimethylxanthine may serve as nitrogenous reactants.

Example 16

43 parts of naphsultam acid are dissolved in 600 parts of water with the addition of a solution of ten parts of sodium hydroxide in 25 parts of water. The solution is filtered and then a filtered solution of 70 parts of ethoxyethyl mercury acetate in 50 parts of water is added drop by drop. Every drop at once produces a precipitation. After some time the precipitation is filtered with suction and then, preferably two times, recrystallized from dilute alcohol and still once more from 99% alcohol. Thus the N-(ethoxyethylmercury)-naphsultam acid is obtained as white well shaped crystals which melt at 131° C. They still display a slightly yellow green surface lustre. When pouring over ammonia water and ammonium sulfide solution a blackening by the formation of mercuric sulfide begins only after about 10 minutes. Also after a prolonged standing with a 10% caustic soda solution, a black solution, but no precipitation of mercuric oxide is obtained. When heating, however, the new compound with dilute hydrochloric acid, a vivid evolution of ethylene takes place, and in the filtrate mercury ions can be detected by means of caustic soda solution or ammonia water and ammonium sulfide solution.

When starting with 67 parts of methoxyethyl mercury acetate instead of 70 parts of ethoxyethyl mercury acetate, a yellowish precipitate is obtained. This precipitate is recrystallized, preferably two times, from 98% alcohol and then once more from benzene. Thus the pure N-methoxyethyl mercury naphsultam acid is obtained as a slightly yellowish microcrystalline powder. The product is practically insoluble in water, difficultly soluble in cold alcohol, more easily soluble in hot alcohol, methyl alcohol and benzene. At 133° C. it begins to sinter and melts exactly at 135-136° C. If the melt is allowed to solidify, a second melting takes place only at 145-146° C. exactly. The latter fusing point is then no more subject to alteration. Towards the reagents sodium hydroxide solution, ammonia water with ammonium sulfide solution, and hydrochloric acid solution, the compound obtained behaves exactly like the corresponding ethoxyethyl compound.

Example 17

70 parts of ethoxyethyl mercury acetate are dissolved in water and mixed with a solution of 25 parts of benzimidazole in 400 parts of 2½% sodium hydroxide solution in an analogous manner to Example 15. The N-(ethoxyethylmercury)-benzimidazole is separated as a paste-like mass which soon hardens. It can, however, not be recrystallized from methyl alcohol, ethyl alcohol and acetone without decomposition. Also this compound shows the reactions of the mercury ion only after previous heating with hydrochloric acid solution, since otherwise neither ammonia water and ammonium sulfide solution nor sodium hydroxide solution will cause any precipitation.

Instead of the benzimidazole also substitution products thereof may be used, for instance benzimidazoles in which a hydrogen atom of the benzene nucleus is substituted by the nitro group.

This application is a continuation in part application of my application Ser. No. 28,772 filed June 27, 1935.

I claim:—

1. An organic mercury compound, in which one valency of the mercury atom is bound to an alkoxyalkyl radical and the other to a nitrogen atom.

2. An organic mercury compound, in which one valency of the mercury atom is bound to an alkoxyalkyl radical and the other to a nitrogen atom which is cyclically bound.

3. An organic mercury compound, in which one valency of the mercury atom is bound to an alkoxyalkyl radical and the other to a nitrogen atom which is linked to a radical which has from an α-position to the nitrogen atom a double bond.

4. An organic mercury compound, in which one valency of the mercury atom is bound to an alkoxyalkyl radical and the other to a nitrogen atom of a barbituric acid.

5. An organic mercury compound, in which one valency of the mercury atom is bound to an alkoxyalkyl radical of the formula

ROCH$_2$CH$_2$— in which R stands for an alkyl group containing from 1 to 2 carbon atoms and in which the other valency of the mercury atom is linked to a nitrogen atom of a barbituric acid.

6. An organic mercury compound, in which one valency of the mercury atom is bound to an alkoxyalkyl radical and the other to a nitrogen atom which is linked to the —SO$_2$R group wherein R stands for an organic radical.

7. An organic mercury compound, in which one valency of the mercury atom is bound to an alkoxyalkyl radical and the other to a nitrogen atom which is linked to the —SO$_2$R group wherein R stands for an aromatic radical.

8. An organic mercury compound, in which one valency of the mercury atom is bound to an alkoxyalkyl radical and the other to a nitrogen atom which is linked to the —SO$_2$R group wherein R stands for an aromatic radical and is simultaneously member of a heterocyclic ring system.

9. An organic mercury compound, in which one valency of the mercury atom is bound to an alkoxyalkyl radical and the other to a nitrogen atom of a naphsultam acid.

10. An organic mercury compound, in which one valency of the mercury atom is bound to an alkoxyalkyl radical of the formula

ROCH$_2$CH$_2$— in which R stands for an alkyl group containing from 1 to 2 carbon atoms and in which the other valency of the mercury atom is linked to a nitrogen atom of a naphsultam acid.

11. An organic mercury compound, in which one valency of the mercury atom is bound to an alkoxyalkyl radical and the other to a nitrogen atom of a carbazole.

12. An organic mercury compound in which one valency of the mercury atom is bound to an alkoxyalkyl radical of the formula

ROCH$_2$CH$_2$— in which R stands for an alkyl group containing from 1 to 2 carbon atoms and in which the other valency of the mercury atom is linked to a nitrogen atom of a carbazole.

JÜRGEN CALLSEN.